Patented Mar. 29, 1938

2,112,553

UNITED STATES PATENT OFFICE 2,112,553

MANUFACTURE OF I-INOSITOL

Edward Bartow and William W. Walker, Iowa City, Iowa

No Drawing. Application June 7, 1935, Serial No. 25,420. Renewed January 22, 1938

4 Claims. (Cl. 260—153)

This invention relates to improvement of the method for manufacturing i-inositol, hexahydroxycyclohexane, $(CHOH)_6$,

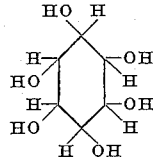

and has for its object, production of i-inositol more easily and at prices far below those now in existence in the chemical industry. The improvement is acomplished by the use of neutral, alkaline, or very dilute acid solution for hydrolysis or decomposition, by an improved method of extraction, and by a reduction in the number and amounts of chemical reagents required.

The compound i-inositol is used in bacteriology and has been tested for possible use in medicine. It can be nitrated and used as an explosive or it can possibly be acetylated and used as a rubber accelerator. It is prepared from a plant extract consisting chiefly of an impure calcium-magnesium salt of phytic acid, $C_6H_6O_6(PO(OH)_2)_6$, known as "phytin".

"Phytin" is obtained by extracting with dilute acid solution such as dilute hydrochloric (HCl) or sulfuric acid ($H_2SO_4$), various vegetable materials including seeds and grains such as corn, wheat, oats, etc. By this extraction in weak acid solution a variety of acid soluble constituents are obtained in a solution which can be separated by filtration or other suitable mechanical treatment.

From this liquid, a portion of the acid soluble material, including insoluble salts and other compounds, is precipitated by the addition of an alkali reagent; for example, $Ca(OH)_2$, NaOH, $Na_2CO_3$, $(NH_4)_2CO_3$, etc. until the neutral point of the solution, approximately pH 7.0 is reached. This insoluble precipitate, known as "phytin" can be removed by filtration, sedimentation or other suitable mechanical means.

The calcium-magnesium content is variable depending on the plan source and the alkaline reagent used for the precipitation. The "phytin" is an impure phytic acid salt, containing other compounds.

Heretofore in the preparation of i-inositol i. e., inactive inositol from the impure "phytin" the "phytin" has been decomposed or hydrolyzed by strong sulfuric acid ($H_2SO_4$) solution. The hydrolysis has been carried out in a sealed tube or in open vessels, in the latter case using the higher acid concentrations. The majority of workers have used approximately 30% sulfuric acid solution and have hydrolyzed the mixture in a steam digester or autoclave with varying steam pressures for varying intervals of time.

In reactions as heretofore carried out using strong sulfuric acid in excess there are formed precipitates of calcium or magnesium sulfate, the solution containing sulfuric and phosphoric acids in addition to the desired i-inositol. It has been necessary to eliminate these acids by precipitation with alkaline reagents such as a barium compound followed by carbonation to remove the barium.

By the process of the present invention the need for these additional chemicals is entirely or practically eliminated. According to this process it has been found that the hydrolysis can be accomplished without the addition of any acid and by merely mixing the "phytin" with varying quantities of water under pressure; as for example, mixing "phytin" one part and water 1 to 100 parts, to form at least a thin paste, followed by hydrolyzing the mixture in a closed vessel with steam pressure of from 1 to 200 pounds for intervals of from 1 to 50 hours the time required being correspondingly less for higher pressures. It has been found further that hydrolysis can be accomplished at a higher pH even, by alkaline solutions such as lime water $Ca(OH)_2xH_2O$, or baryta water $Ba(OH)_2xH_2O$ of different strengths, as well as by dilute acid solutions of less than 10% concentration. The same pressures and time intervals as in the acid hydrolysis will produce good yields of i-inositol.

Hydrolysis of "phytin" breaks the complex molecule into free i-inositol and calcium and magnesium phosphates, $Ca_3(PO_4)_2$, $CaHPO_4$, $Mg_3(PO_4)_2$, $MgHPO_4$, etc. These calcium and magnesium phosphates are sparingly soluble in water and settle as insoluble sludges, when the solution is alkaline or made alkaline by a precipitating agent such as $Ca(OH)_2$, CaO, $Ba(OH)_2$, BaO, etc. The i-inositol is in solution or adsorbed on the flocculent insoluble fraction or sludge.

Although filtration and washing on the filter can be used, it is now found more satisfactory to remove the hydrolysis mixture from the autoclave and dilute it with water. This mixture is then heated to the boiling point either with steam under pressure or with outside heat and the suspended sludge is vigorously agitated, with the result that more complete removal of the i-inositol is obtained. The solution containing the i-inositol can be given a primary separation as by decantation of supernatant clear liquid from the sludge. More water is then added to the separated sludge for a supplementary or more complete washing while being similarly heated and agitated, and the clear liquid again decanted. Repetition of this procedure, as needed, removes the i-inositol from the sludge formed.

Inactive inositol may be prepared from starch factory steep water which is the liquid in which corn is steeped to soften the covering of the corn kernel and to thoroughly soften the entire kernel. It contains approximately 1% sulfurous acid ($H_2SO_3$) in solution. A typical example of such treatment consists in adding to the acid steep water, lime $Ca(OH)_2$ or CaO to approximate neutrality, or to a pH of 6.0 to 8.0, at which range the insoluble "phytin" is precipitated. This precipitate of impure "phytin" or calcium phytate is removed by suitable means, as stated before, and may be mixed with (1) 1 to 10% acid solution; or (2) diluted with water; or (3) the solution may be made alkaline. This alkaline or neutral or acid mixture is placed in a suitable container in an autoclave or steam digester, and the steam turned on whereupon the reaction is allowed to proceed as long as desired. The autoclave in which the mixture has been placed may be heated by generating steam therein, by means of an electric heater, or by suitable heat from outside. A pressure of from 1 to 200 pounds steam for 1 to 18 hours may be used, the time required being correspondingly less for higher pressures. A suitable pressure is 80 pounds. The time expected for 80 pounds is three hours.

After hydrolysis or decomposition is complete, pressure is released, the autoclave cooled, the mixture removed, diluted, and made alkaline with $Ca(OH)_2$, $Ba(OH)_2$ etc., brought to boiling, thoroughly agitated with steam, the insoluble sludge allowed to settle, and the supernatant liquid removed by decantation, siphoning or filtration. The supernatant liquid is concentrated in an open vessel, or in vacuum, to remove the precipitating inorganic impurities as calcium carbonate ($CaCO_3$), magnesium carbonate ($MgCO_3$), etc. The liquid is concentrated until it becomes thick and syrupy. The concentrated solution is filtered, cooled, and agitated by a suitable mechanical means to precipitate i-inositol. The i-inositol is removed by filtration, the mother liquor concentrated, and the process repeated until the solution becomes too thick to filter advantageously. A filter press may be employed to remove further quantities of i-inositol, or the thick residue may be diluted with a reagent in which i-inositol is insoluble; as for example, acetic acid ($CH_3COOH$) and alcohol-acetic acid ($C_2H_5OH$, $CH_3COOH$ etc.). On cooling and stirring the solution, additional i-inositol, etc., results and can be removed by filtration or other mechanical means. The i-inositol may be recrystallized by dissolving the crude product in boiling water, and reprecipitated by cooling and stirring. The final crystallization from a hot water solution to which an equal volume of alcohol is added with cooling and stirring, gives a purer product.

It will be understood from this patent that we do not limit ourselves to any specific acid concentration below 10% or to any specific acid; as for example, hydrochloric (HCl), sulfuric ($H_2SO_4$) phosphoric ($H_3PO_4$) etc. We wish to include the neutral solution and all strengths of alkaline solution up to 25% alkali; for example, lime CaO, $Ca(OH)_2$, BaO, $Ba(OH)_2$, etc. are suitable solutions in which phytin may be satisfactorily hydrolyzed. It will be understood that any method of heating or agitating the mixture by steam or other heated vapors to remove the adsorbed i-inositol from the insoluble sludges are included in this method. It will be understood that any application of decantation or siphoning or other similar mechanical means to remove the supernatant liquid are included in our method. It will be further understood that we do not limit ourselves to the use of any particular type or size of autoclave, any definite steam or vapor pressure, or any definite time intervals for the hydrolysis reaction.

We claim:

1. The method for the manufacture of i-inositol by the decomposition of phytin in which the decomposition is effected in alkaline solution of a concentration below that corresponding to 25% alkalinity.

2. The method for the manufacture of i-inositol by the decomposition of salts of phytic acid in which the decomposition is effected in alkaline solution below 25%.

3. The process for the manufacture of i-inositol from phytic acid salts which comprises decomposing the salts by means of steam and pressure in an alkaline solution of alkalinity less than 25%, carrying out a primary separation of the resultant solution and the precipitate, adding water to the separated precipitate, heating and agitating to remove adsorbed i-inositol from the precipitate, and carrying out a supplementary separation of the precipitate from the solution.

4. The process for the manufacture of directly separable i-inositol from phytin prepared directly from vegetable materials which comprises decomposing the phytin by means of steam and pressure in a solution of approximately 0 to 25% alkalinity, carrying out a primary separation of the resultant solution and the precipitate, adding water to the separated precipitate, heating and agitating to remove adsorbed i-inositol from the precipitate, and carrying out a supplementary separation of the precipitate from the solution.

EDWARD BARTOW.
WILLIAM W. WALKER.